US012596257B2

(12) United States Patent
Chriki et al.

(10) Patent No.: US 12,596,257 B2
(45) Date of Patent: Apr. 7, 2026

(54) DISPLAYS INCLUDING LIGHT-GUIDE OPTICAL ELEMENTS WITH TWO-DIMENSIONAL EXPANSION

(71) Applicant: Lumus Ltd., Ness Ziona (IL)

(72) Inventors: Ronen Chriki, Lod (IL); Tsion Eisenfeld, Ashkelon (IL)

(73) Assignee: Lumus LTD., Ness Ziona (IL)

( * ) Notice: Subject to any disclaimer, the term of this patent is extended or adjusted under 35 U.S.C. 154(b) by 255 days.

(21) Appl. No.: 18/284,541

(22) PCT Filed: Apr. 11, 2022

(86) PCT No.: PCT/IL2022/050374
§ 371 (c)(1),
(2) Date: Sep. 28, 2023

(87) PCT Pub. No.: WO2022/219628
PCT Pub. Date: Oct. 20, 2022

(65) Prior Publication Data
US 2024/0176146 A1 May 30, 2024

Related U.S. Application Data

(60) Provisional application No. 63/231,765, filed on Aug. 11, 2021, provisional application No. 63/173,435, filed on Apr. 11, 2021.

(51) Int. Cl.
*G02B 27/01* (2006.01)

(52) U.S. Cl.
CPC .. *G02B 27/0172* (2013.01); *G02B 2027/0116* (2013.01); *G02B 2027/0178* (2013.01)

(58) Field of Classification Search
CPC ........ G02B 27/0172; G02B 2027/0116; G02B 2027/0178; G02B 6/0016; G02B 6/26; G02B 27/42; H04N 9/31
See application file for complete search history.

(56) References Cited

U.S. PATENT DOCUMENTS

| | | | |
|---|---|---|---|
| 6,829,095 B2 | 12/2004 | Amitai | |
| 7,457,040 B2 | 11/2008 | Amitai | |
| 2008/0025667 A1 | 1/2008 | Amitai | |
| 2010/0202048 A1 | 8/2010 | Amitai et al. | |
| 2017/0045742 A1 | 2/2017 | Greenhalgh et al. | |
| 2018/0149873 A1* | 5/2018 | Edwin .................. | G02B 27/106 |
| 2020/0064630 A1 | 2/2020 | Pfeiffer et al. | |

(Continued)

FOREIGN PATENT DOCUMENTS

| | | | | |
|---|---|---|---|---|
| WO | WO-2020049542 A1 * | 3/2020 | ......... | G02B 27/0018 |
| WO | 2022044001 | 3/2022 | | |

*Primary Examiner* — Mariam Qureshi
(74) *Attorney, Agent, or Firm* — Rivka Friedman

(57) ABSTRACT

A display (10) includes a flat light-guide optical element (LOE) (100) having first and second progressive deflection arrangements associated with first and second regions (110, 120) of the LOE. A support arrangement (106), such as a glasses frame, supports the LOE in facing relation to the eye of the user. An image projector (200) injects a collimated image into the LOE via a reflective coupling-in surface (131). The reflective coupling-in surface is preferably obliquely oriented to both the major horizontal and vertical axes of the LOE. A multi-component wedge (132) is preferably used to compensate for chromatic aberration.

9 Claims, 8 Drawing Sheets

Sideview

(56)  References Cited

U.S. PATENT DOCUMENTS

| | | |
|---|---|---|
| 2020/0150330 A1 | 5/2020 | Danziger et al. |
| 2020/0310024 A1 | 10/2020 | Danziger et al. |
| 2022/0004007 A1 | 1/2022 | Bhakta et al. |
| 2022/0082838 A1 | 3/2022 | Grabarnik et al. |
| 2022/0269098 A1 | 8/2022 | Danziger et al. |
| 2022/0357499 A1 | 11/2022 | Danziger et al. |
| 2022/0390665 A1 | 12/2022 | Grabarnik et al. |
| 2022/0390747 A1 | 12/2022 | Eisenfeld |
| 2023/0359034 A1 | 11/2023 | Ronen |

* cited by examiner

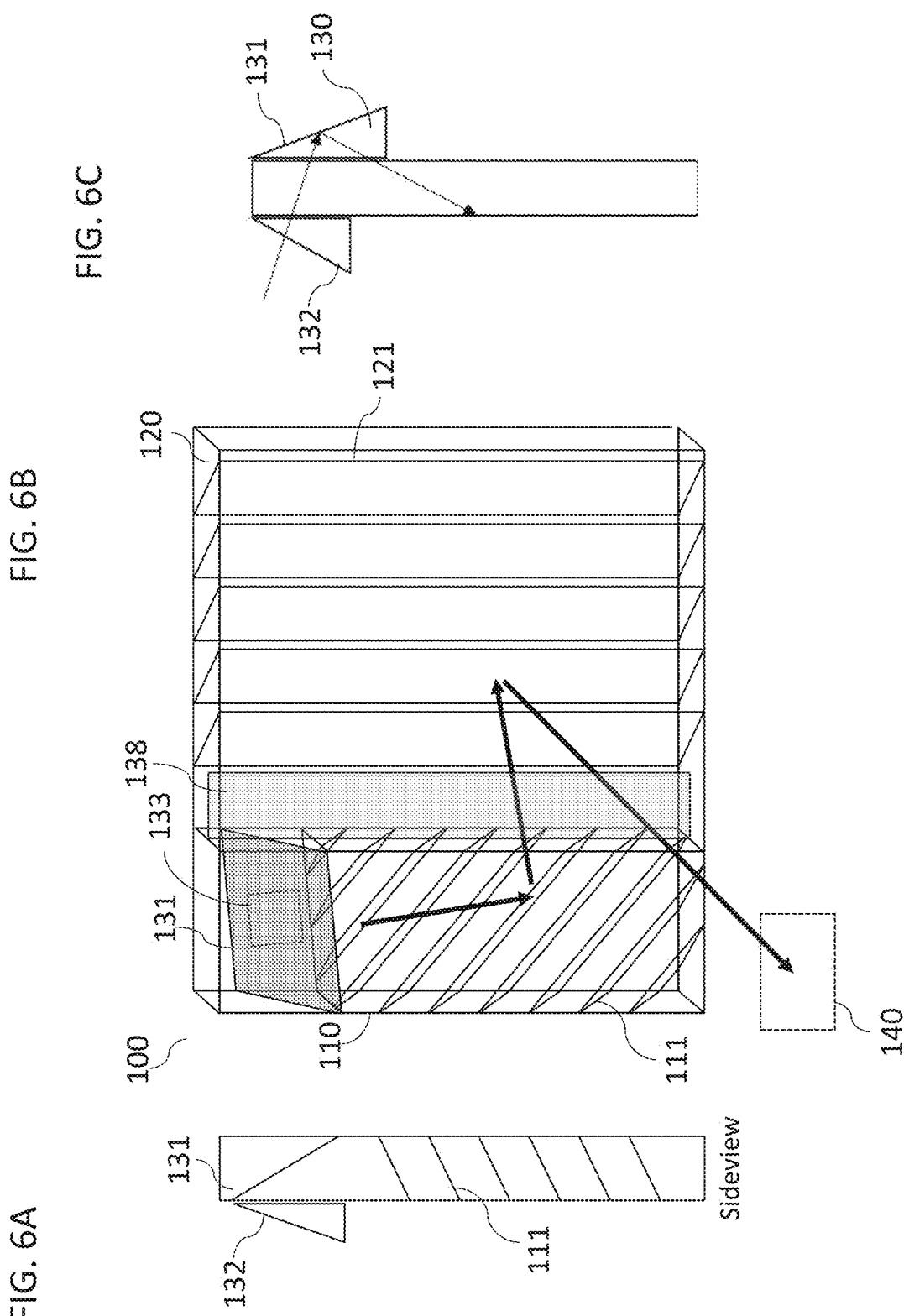

FIG. 8A
FIG. 8B
FIG. 8C
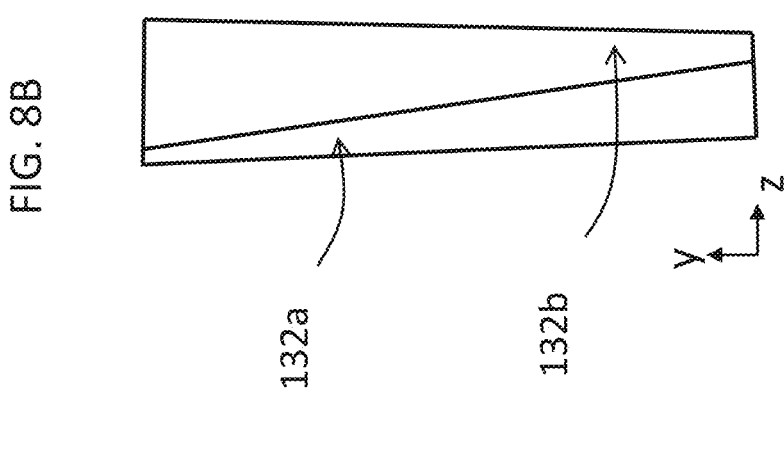
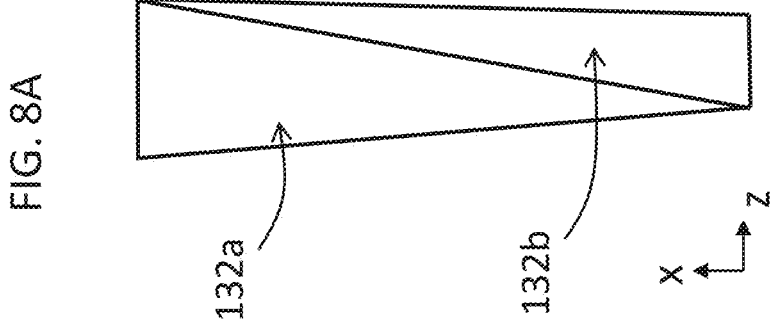

DISPLAYS INCLUDING LIGHT-GUIDE OPTICAL ELEMENTS WITH TWO-DIMENSIONAL EXPANSION

FIELD AND BACKGROUND OF THE INVENTION

The present invention relates to optical systems and, in particular, it concerns an optical system including a light-guide optical element (LOE) for achieving optical aperture expansion.

Many near-eye display systems include a transparent light-guide optical element (LOE) or "waveguide" placed before the eye of the user, which conveys an image within the LOE by internal reflection and then couples out the image by a suitable output coupling mechanism towards the eye of the user. The output coupling mechanism may be based on embedded partial reflectors or "facets," or may employ a diffractive pattern. The description below will refer primarily to a facet-based coupling-out arrangement, but it should be appreciated that various features of the invention are also applicable to diffractive arrangements.

In order to employ a small image projector to provide a desired field of view (FOV), various systems employ two-dimensional aperture expansion, either via two sets of embedded partial reflectors or by two diffractive optical elements, each achieving a different dimension of aperture expansion. Examples of such devices may be found in PCT Patent Application Publication No. WO 2020/049542 A1, that is coassigned with the present application.

Compact head mount displays pose design challenges. The geometry of the waveguide itself imposes stringent requirements. It is preferably that the projector should be integrated in a way that conforms aesthetically to the geometry of a glasses frame carrying the waveguide, but the requirements from the waveguide typically dictate a preferred orientation of the projector which is unfavorable for the aesthetic requirements.

SUMMARY OF THE INVENTION

The present invention is a display.

According to the teachings of an embodiment of the present invention there is provided, a display for directing image illumination to an eye-motion box for viewing by an eye of a user, the display comprising: (a) a light-guide optical element (LOE) formed from transparent material, the LOE having: (i) a set of mutually-parallel major external surfaces, (ii) a first progressive deflection arrangement associated with the LOE in a first region of the LOE, and (iii) a second progressive deflection arrangement associated with the LOE in a second region of the LOE; (b) a support arrangement configured for supporting the LOE relative to the head of the user with one of the major external surfaces in facing relation to the eye of the user and in an orientation relative to the eye of the user such that an X axis parallel to the major external surfaces is oriented horizontally, a Y axis being parallel to the major external surface and perpendicular to the X axis; (c) an image projector configured to project a collimated image from a projector aperture, the collimated image including a principal ray aligned with an optical axis of the image projector; and (d) a reflective coupling-in surface, the LOE, the image projector and the reflective coupling-in surface being arranged such that the collimated image projected from the image projector is deflected by reflection at the reflective coupling-in surface and coupled into the LOE so as to propagate in a first direction within the LOE by internal reflection at the major external surfaces towards the first region, is redirected by the first progressive deflection arrangement so as to propagate in a second direction within the LOE by internal reflection at the major external surfaces towards the second region, and is redirected by the second progressive deflection arrangement so as to be coupled out of the LOE towards the eye of the user, and wherein the reflective coupling-in surface is obliquely oriented to both the X axis and the Y axis.

According to a further feature of an embodiment of the present invention, the reflective coupling-in surface crosses a plane of one of the major external surfaces so as to lie partially within a thickness of the LOE and partially outside the thickness.

According to a further feature of an embodiment of the present invention, the reflective coupling-in surface is provided at least in part by a surface of a prism attached to an edge of the LOE.

According to a further feature of an embodiment of the present invention, the reflective coupling-in surface is provided at least in part by a surface of a prism attached to one of the major external surfaces.

According to a further feature of an embodiment of the present invention, there is also provided a transparent wedge element deployed in an optical path between the image projector and the reflective coupling-in surface, the transparent wedge providing an input surface associated with the projector aperture and an output surface parallel to one of the major external surfaces of the LOE.

There is also provided according to the teachings of an embodiment of the present invention, a display for directing image illumination to an eye-motion box for viewing by an eye of a user, the display comprising: (a) a light-guide optical element (LOE) formed from transparent material, the LOE having: (i) a set of mutually-parallel major external surfaces, (ii) a first progressive deflection arrangement associated with the LOE in a first region of the LOE, and (iii) a second progressive deflection arrangement associated with the LOE in a second region of the LOE; (b) a support arrangement configured for supporting the LOE relative to the head of the user with one of the major external surfaces in facing relation to the eye of the user and in an orientation relative to the eye of the user such that an X axis parallel to the major external surfaces is oriented horizontally, a Y axis being parallel to the major external surface and perpendicular to the X axis; (c) an image projector configured to project a collimated image from a projector aperture, the collimated image including a principal ray aligned with an optical axis of the image projector; (d) a reflective coupling-in surface; and (e) a transparent wedge element deployed in an optical path between the image projector and the reflective coupling-in surface, the transparent wedge providing an input surface associated with the projector aperture and an output surface parallel to one of the major external surfaces of the LOE, the LOE, the image projector and the reflective coupling-in surface being arranged such that the collimated image projected from the image projector passes through the transparent wedge, is deflected by reflection at the reflective coupling-in surface and coupled into the LOE so as to propagate in a first direction within the LOE by internal reflection at the major external surfaces towards the first region, is redirected by the first progressive deflection arrangement so as to propagate in a second direction within the LOE by internal reflection at the major external surfaces towards the second region, and is redirected by the second progressive deflection arrangement so as to be coupled out of the LOE towards the eye of the user.

According to a further feature of an embodiment of the present invention, the transparent wedge is formed from at least two wedge components formed from materials having different dispersive properties.

According to a further feature of an embodiment of the present invention, the at least two wedge components include a first wedge element having two non-parallel surfaces converging towards a first line of intersection and a second wedge element having two non-parallel surfaces converging towards a second line of intersection, the first and second wedge elements being oriented such that the first and second lines of intersection are non-parallel.

According to a further feature of an embodiment of the present invention, the input surface is perpendicular to the principal ray of the collimated image.

According to a further feature of an embodiment of the present invention, the output surface is associated with one of the major external surfaces via an air space or a low-index adhesive.

According to a further feature of an embodiment of the present invention, the first progressive deflection arrangement comprises a first set of planar, mutually-parallel, partially-reflecting surfaces located between the major external surfaces in the first region of the LOE and having a first orientation, and wherein the second progressive deflection arrangement comprises a second set of planar, mutually-parallel, partially-reflecting surfaces located between the major external surfaces in the second region of the LOE and having a second orientation non-parallel to the first orientation and oblique to the major external surfaces.

According to a further feature of an embodiment of the present invention, the first and second progressive deflection arrangements are implemented as first and second diffractive optical elements.

BRIEF DESCRIPTION OF THE DRAWINGS

The invention is herein described, by way of example only, with reference to the accompanying drawings, wherein:

FIGS. 6A and 6B are a side view and an isometric view, respectively, of an optical assembly from a further exemplary embodiment of a display, constructed and operative according to the teachings of the present invention;

FIG. 6C is a side view of an optical assembly from a still further exemplary embodiment of a display, constructed and operative according to the teachings of the present invention;

FIGS. 8A-8C are first and second cross-sectional views and a plan view of a further preferred implementations of an input wedge prism for compensation for chromatic aberration according to an aspect of the present invention, where FIGS. 8A and 8B are cross-sections taken along lines A-A and B-B, respectively, in FIG. 8C.

DESCRIPTION OF THE PREFERRED EMBODIMENTS

Figure 1:
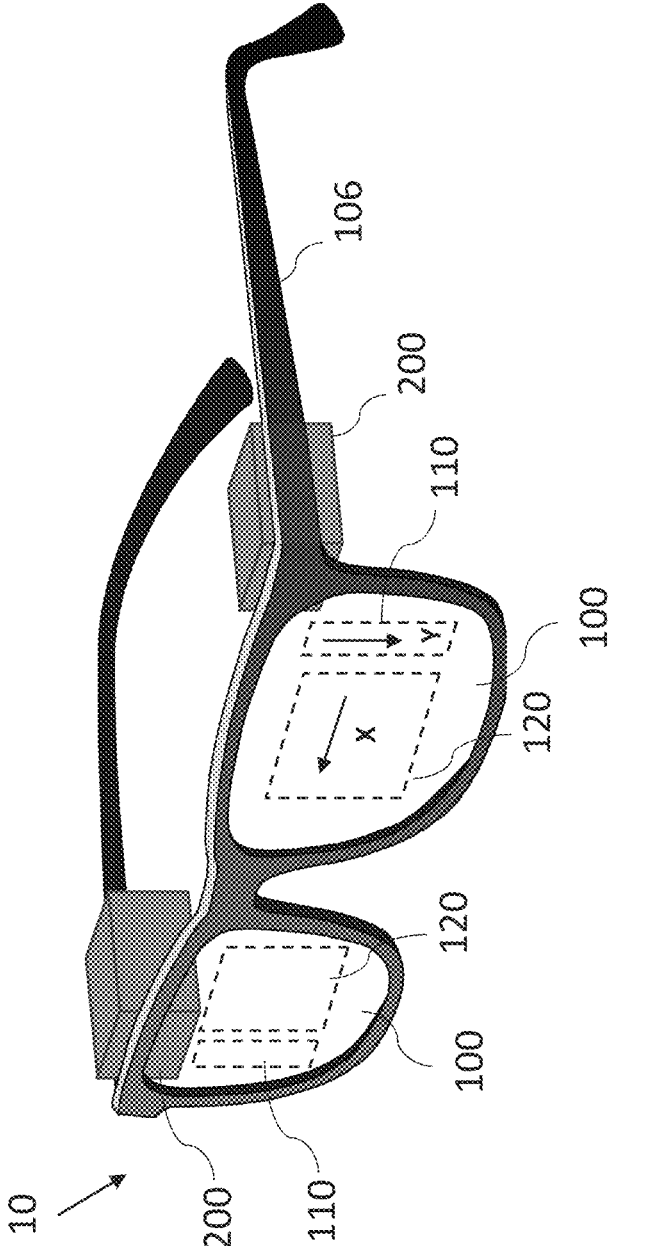
FIG. 1 is a schematic isometric view of an optical system implemented using a light-guide optical element (LOE), constructed and operative according to the teachings of the present invention, for providing an augmented reality near-eye display to a user.

Certain embodiments of the present invention provide a display for directing image illumination to an eye-motion box for viewing by an eye of a user, typically as a head-up display, and most preferably a near-eye display, which may be a virtual reality display, or more preferably an augmented reality display.

Exemplary implementations of a device in the form of a near-eye display, generally designated 10, according to the teachings of certain embodiments of the present invention, are illustrated schematically in FIGS. 1-6B. The display employs a light-guide optical element (LOE) 100 (interchangeably referred to as a "waveguide," a "substrate" or a "slab"), formed from transparent material, having a set of mutually-parallel major external surfaces 102 and 104 (FIGS. 2A and 2B), a first progressive deflection arrangement associated with the LOE in a first region 110 of the LOE, and a second progressive deflection arrangement associated with the LOE in a second region 120 of the LOE.

The LOE 100, and more preferably a pair of LOE's, one for each eye, are supported relative to the head of the user by a support arrangement 106, with one of the major external surfaces 102 in facing relation to the eye of the user and in an orientation relative to the eye of the user such that an X-axis parallel to the major external surfaces is oriented horizontally. A Y-axis is defined as a direction parallel to the major external surface 102 and perpendicular to the X-axis.

The near-eye display 10 also includes an image projector 200 (also referred to herein as a "POD") configured to project a collimated image from a projector aperture. The collimated image includes a principal ray (typically the center-field of the FOV of the image) aligned with an optical axis of the image projector.

In order to couple the image projected from image projector 200 into the LOE, a reflective coupling-in surface 131 (also referred to as a "mirror") is provided, as illustrated in various variations in FIGS. 4A-6B. The LOE 100, the image projector 200 and the reflective coupling-in surface 131 are arranged such that the collimated image projected from image projector 200 is deflected by reflection at the reflective coupling-in surface 131 and coupled into the LOE 100 so as to propagate in a first direction within the LOE by internal reflection at the major external surfaces towards the first region 110. The image is then redirected by the first progressive deflection arrangement so as to propagate in a second direction within the LOE by internal reflection at the major external surfaces towards the second region 120, and is redirected by the second progressive deflection arrangement so as to be coupled out of the LOE towards the eye of the user at eye motion box 140. Although the device is illustrated in FIG. 1 as performing the Y-axis expansion first followed by the X-axis expansion, the structure can also be implemented to perform the X-axis expansion first followed by the Y-axis expansion, as will be clear to a person having ordinary skill in the art.

According to one aspect of the present invention, the reflective coupling-in surface 131 is obliquely oriented to both the X axis and the Y axis. This provides a degree of design freedom to achieve a desired initial direction of propagation of the coupled-in image within the LOE without requiring deployment of the image projector at a very specific and potentially problematic orientation for the overall form factor of the device.

The proposed designs thus help to reconcile the waveguide's requirements for the angular orientation of the projector and the aesthetically preferred orientation of the projector, using a highly reflective mirror 131. To better understand these requirements, we refer again to FIG. 1, which presents a head mount display based on a design of a two-dimensional image expansion. The waveguide 100 is composed of two sections, 110 and 120, that each expand the image along a different dimension. The projector 200 projects illumination corresponding to a collimated image that must be coupled into the waveguide. Since the projector has a non-negligible size, especially when large fields of view are required, it should advantageously be oriented such that it could be conveniently aligned behind the frame side and integrated into the frame.

Figures 2A, 2B:
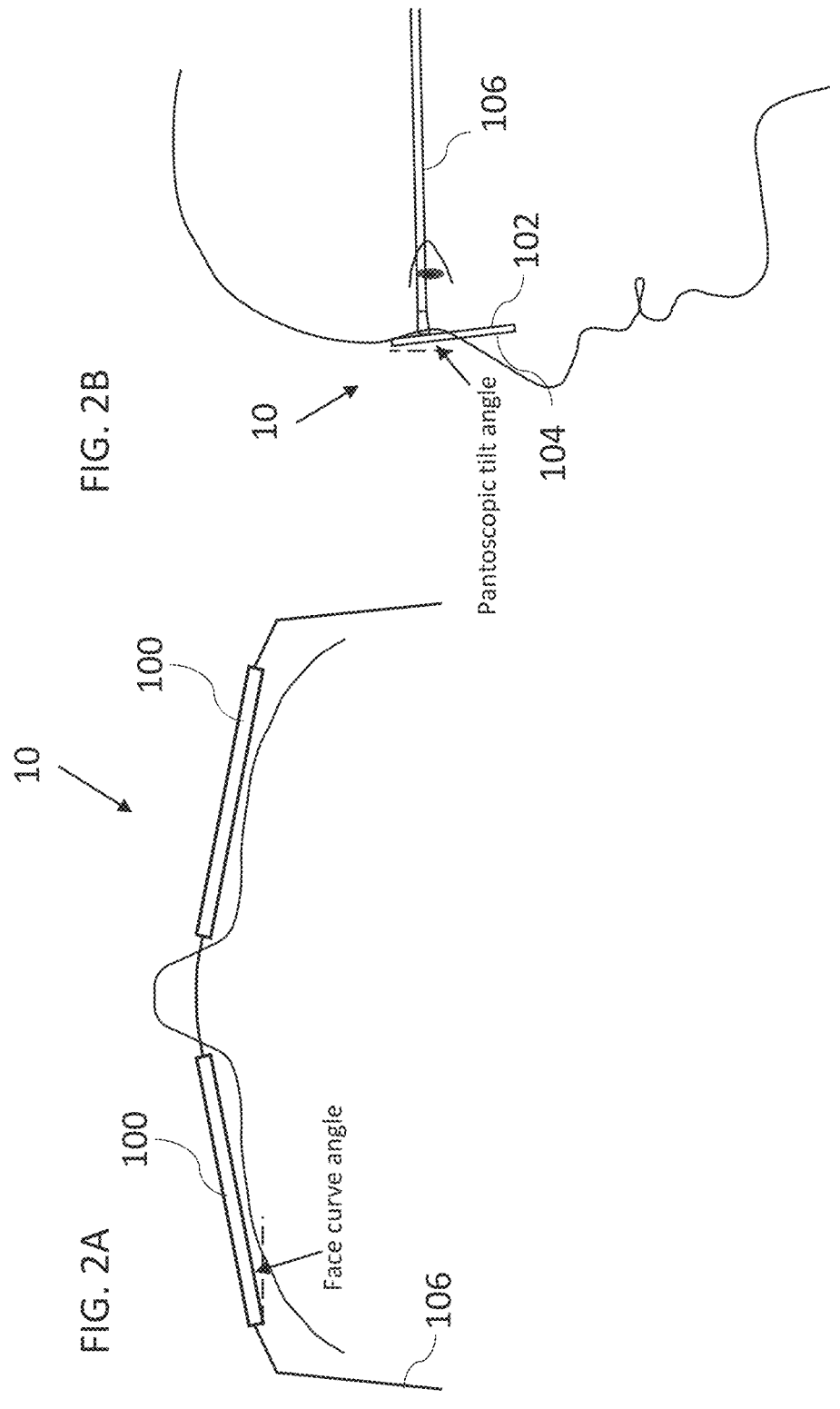
FIGS. 2A and 2B are schematic top and side views, respectively, of the near-eye display of FIG. 1 on the face of a user illustrating angular offsets resulting from the face-curve of the device and a pantoscopic tilt of the device.
Figures 3A, 3B, 3C, 3D:
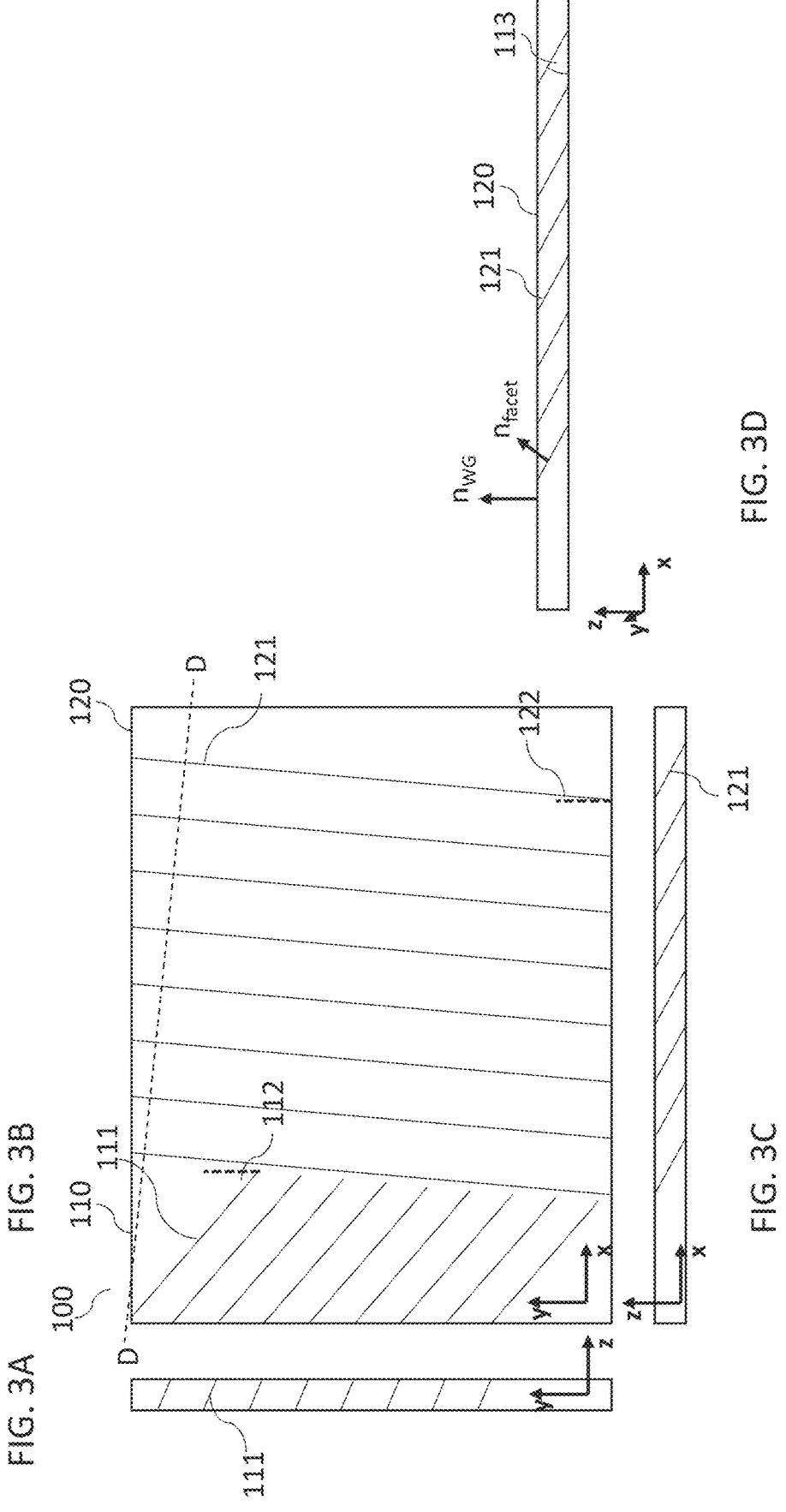
FIGS. 3A-3C are a schematic side view, front view and top view, respectively, of an LOE structure for use in the display of the present invention.
FIG. 3D is a cross-sectional view taken along a plane D-D in FIG. 3B perpendicular to a second set of partially-reflecting surfaces.

Additional complexity in the optical implementation requirements is imposed by tilt of the waveguide 100 both in the vertical and horizontal directions, so as to form face-curve and pantoscopic tilt angles (FIGS. 2A and 2B). As a result, the waveguide is tilted in relation to the line of sight. This tends to induces chromatic aberration due to dispersion. A second aspect of the present invention, complementary to the first, relates to features of the coupling-in configuration that minimize the chromatic aberrations, as discussed further below.

FIGS. 3A-3D show an exemplary structure of a refractive light-guided optical element (LOE) waveguide 100, with two-dimensional image expansion based on partially-reflecting internal surfaces. This structure comprises two sets of parallel partially reflective mirrors (facets) that are embedded into the waveguide, 111 and 121, that are located in different regions of the waveguide 110 and 120. The angular orientation of each facet can be fully described by the azimuth and elevation angles. The azimuth angle, e.g., angle 112, is the angle between the normal to the facet and the normal to a vector that is perpendicular to both the normal to the waveguide and to the horizon, projected onto the plane of the waveguide; and the elevation angle is the angle between the normal to the facet and the normal to (the major external surface of) the waveguide. In an alternative definition, the azimuth angle can be identified as the angle between a line of intersection of the plane of the facet with the major external surface and the Y-axis. The term "azimuth" is used herein to refer to rotation or orientation about an axis perpendicular to the plane of the major external surfaces of the LOE.

Figures 4A, 4B:
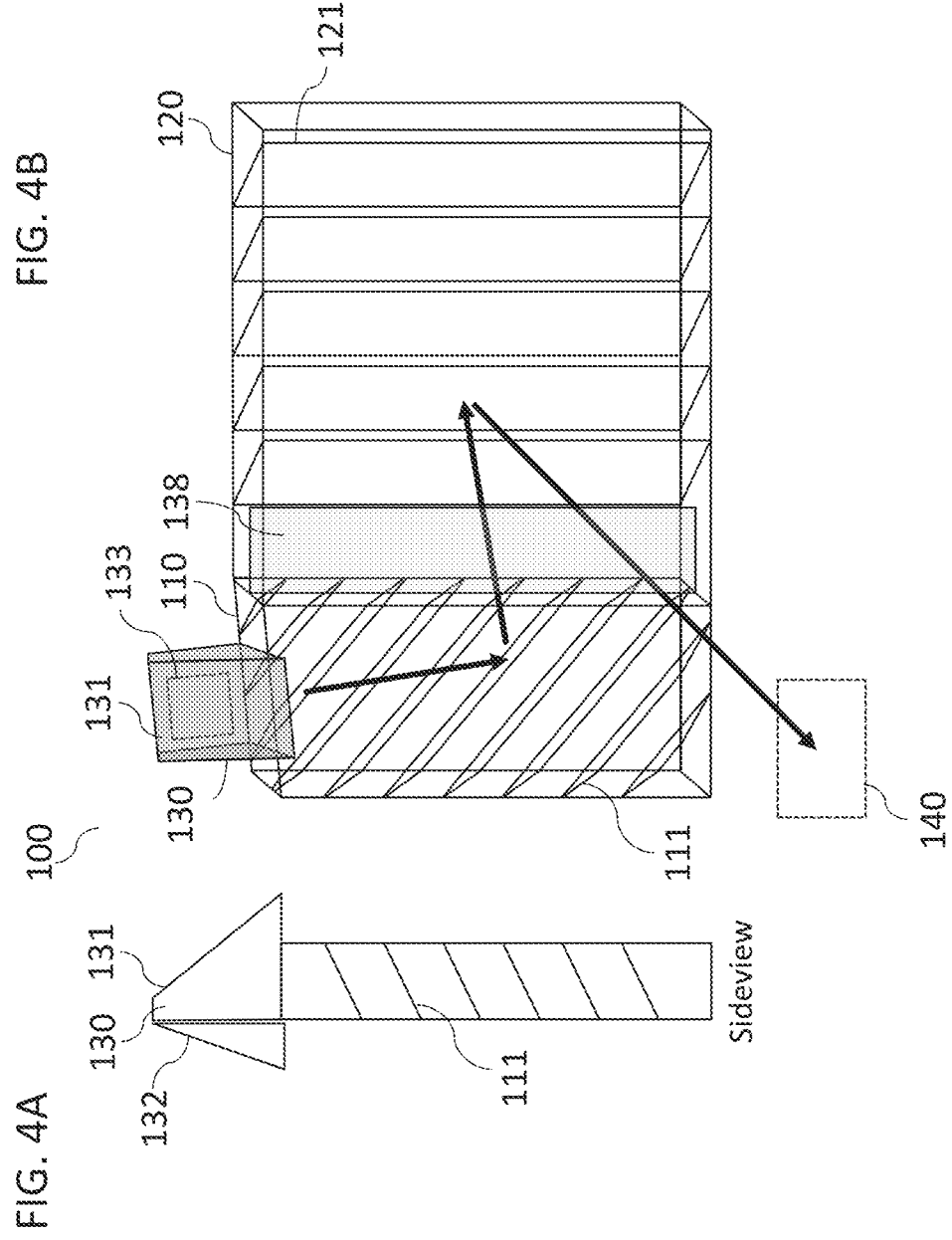
FIGS. 4A and 4B are a side view and an isometric view, respectively, of an optical assembly (without the image projector) from a first exemplary embodiment of a display, constructed and operative according to the teachings of the present invention.

FIGS. 4A and 4B illustrate a first particularly preferred but non-limiting embodiment of the present invention, where a prism 130 is bonded to the waveguide such that light projected from the projector 200 (omitted here, but previously shown in FIG. 1) enters an aperture 133 and propagates through an input wedge 132, and is then reflected by the high-reflectivity mirror 131 and coupled into the waveguide. Light is then trapped by total internal reflection in the waveguide, and propagates in region 110 until it is progressively partially reflected by facets 111 and redirected towards section 120, where it is eventually progressively partially reflected from facets 121 and projected toward the eye motion box 140, where the user's eye is positioned.

It is convenient to design the angular orientation of an input surface of input wedge 132 such that the normal to the external surface is parallel to the central chief ray. In this manner, the projector can be bonded directly to the input surface of input wedge 132. In certain preferred cases, input wedge 132 is separated from the waveguide by an air gap, to eliminate ghosts and enhance aperture filling (eventually leading to high uniformity of the image). This can be achieved, for example, by placing 132 directly on top of the waveguide 100, but with no glue (and where polishing is not exceptionally smooth); or by using an adhesive with a sufficiently low refractive index to maintain internal reflection of the coupled-in image at the interface.

Typically, the elevation angle of the mirror 131 is approximately equal to the elevation angle of the facets 111, although this is not necessarily so.

FIGS. 4A and 4B are thus an example of an embodiment in which the reflective coupling-in surface 131 is provided at least in part by a surface of a prism 130 attached to an edge of the LOE. In some cases, as shown here, the edge surface to which prism 130 is attached is ground to an entrance angle which is non-parallel to the X-axis and the Y-axis, thereby simplifying the structure of prism 130 that is required to generate a correctly oriented coupling-in surface 131 inclined relative to both the X-axis and the Y-axis. In other cases, a more complex prism structure may be employed, bonded to an edge surface that is parallel to one of the axes. In alternative implementations, the reflective coupling-in surface may be provided at least in part by a surface of a prism that is optically bonded to one of the major external surfaces of the waveguide.

Regarding the size of the image projector aperture and of the coupling-in mirror 131, it is possible to implement these to be sufficiently large to "fill" the thickness of the applicant with the image illumination, typically requiring an aperture which is roughly twice the dimension of the waveguide aperture. However, in order to minimize the dimensions of the image projector and of the coupling arrangement, it may be preferable to provide a reduced-size projector aperture and coupling arrangement that does not achieve filling of the waveguide. In this case, filling of the waveguide (and consequent high uniformity of the output image) can be achieved by including an optical aperture multiplier 138, preferably in the form of a partial reflector that is deployed between, and parallel to, the major external surfaces. An optimal multiplier structure is believed to be a midplane partial reflector with 50% reflectance and 50% transmittance, or a pair of parallel partial reflectors with 33% reflectance subdividing the waveguide thickness into 3 layers of equal thickness. The aperture multiplier can be deployed in the light path immediately after coupling in, or between first and second regions 110 and 120, as illustrated here, or both.

According to a further particularly preferred feature exemplified in the embodiment of FIGS. 4A and 4B, the reflective coupling-in surface 131 crosses a plane of one of the major external surfaces so as to lie partially within a thickness of the LOE and partially outside the thickness.

This renders the design compact in the thickness dimension of the waveguide while providing design flexibility to increase the size of the coupling-in surface.

Figures 5A, 5B:
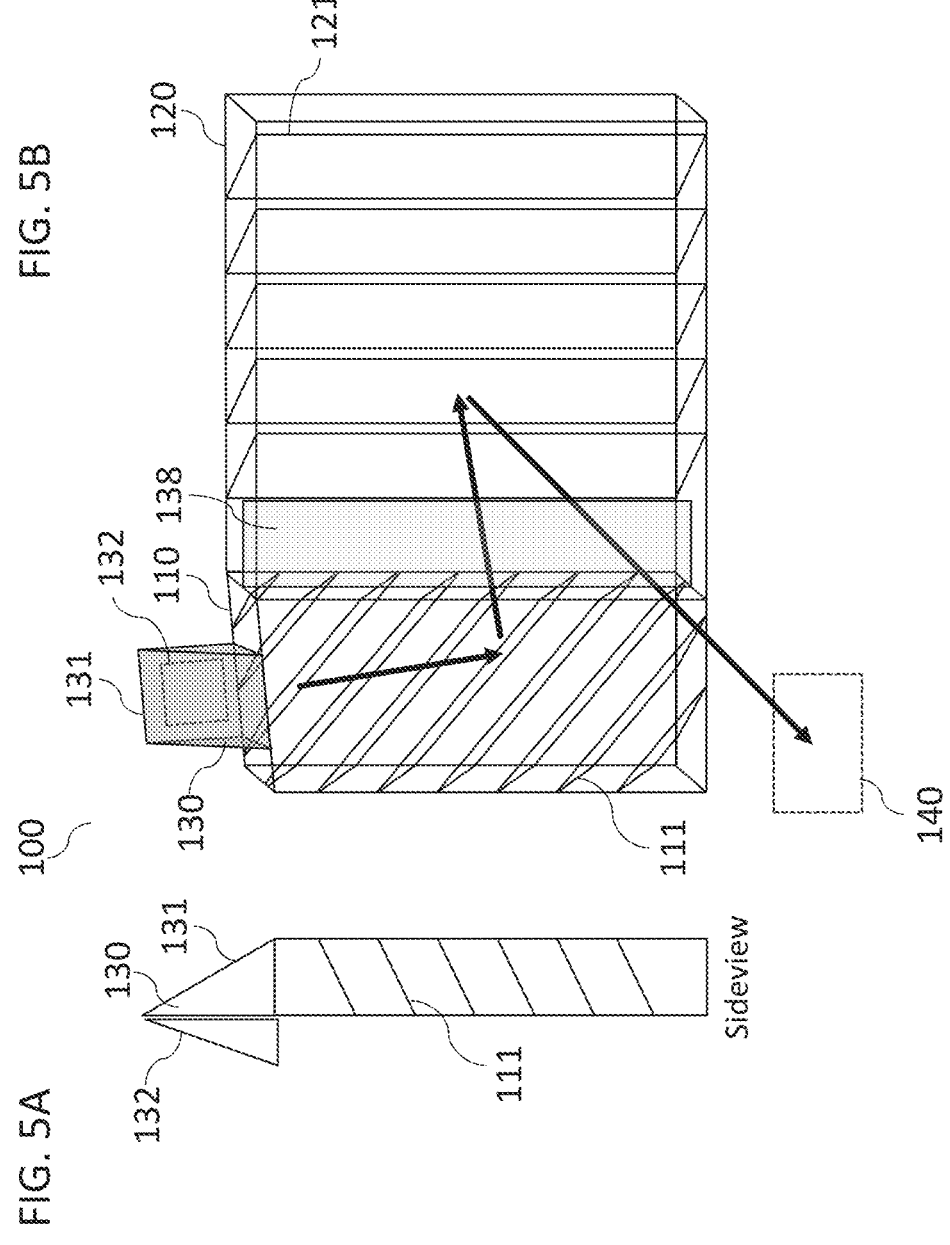
FIGS. 5A and 5B are a side view and an isometric view, respectively, of an optical assembly from an alternative exemplary embodiment of a display, constructed and operative according to the teachings of the present invention.

FIGS. 5A and 5B show a variant of the embodiment of FIGS. 4A and 4B, where the mirror 131 is limited to the thickness of the waveguide, and does not protrude beyond the waveguide. In some cases, this configuration is preferred, due to the compact form factor. The structure and operation of this variant is similar to that of FIGS. 4A and 4B, but results in less complete filling of the waveguide, such that the aperture multiplier 138 takes on increased importance.

FIGS. 6A and 6B disclose an embodiment structurally similar to FIGS. 5A and 5B, but here the mirror 131 is integrated into the structure of the waveguide and is produced as another facet.

FIG. 6C illustrates schematically a further option according to which reflective coupling-in surface 131 is provided at least in part by a surface of a prism 130 attached to one of the major external surfaces of the LOE, preferably opposite an input wedge element 132. An initial portion of an exemplary input-coupled ray of image light is illustrated here by lines with arrowheads.

Figures 7A, 7B, 7C, 7D:
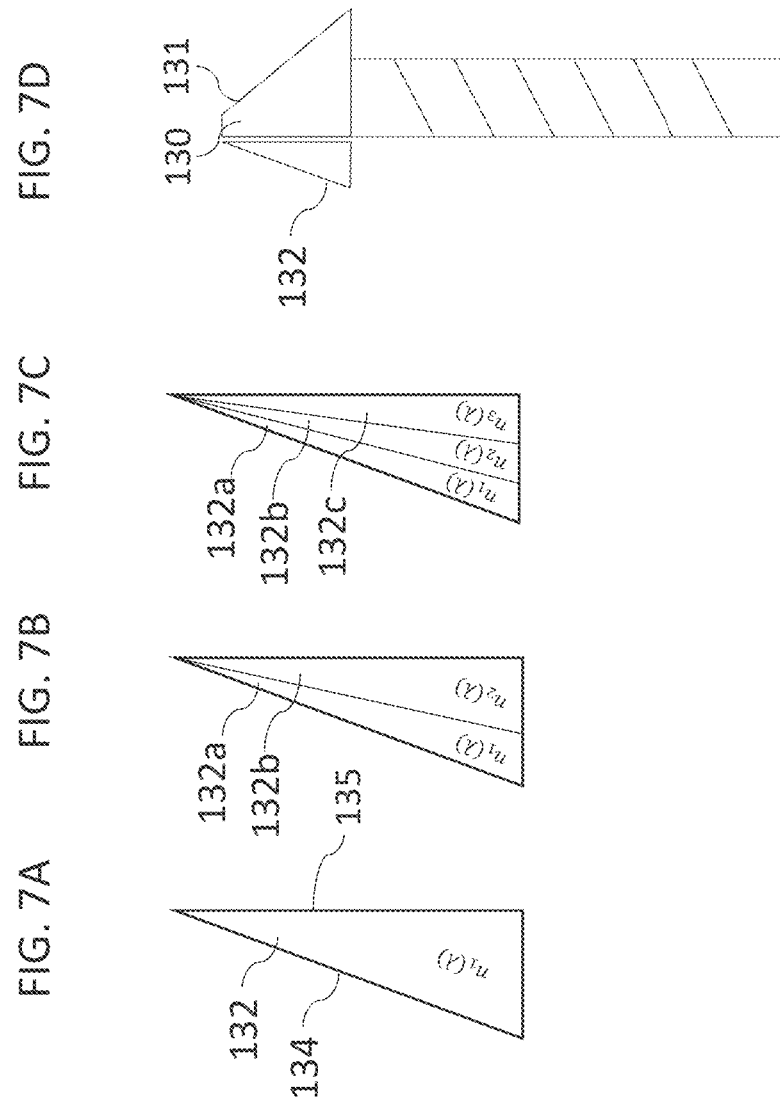
FIGS. 7A-7C are schematic side views of an input wedge prism for compensation for chromatic aberration according to an aspect of the present invention.
FIG. 7D is a view similar to FIG. 4A illustrating a preferred deployment of the input wedge prism of FIGS. 7A-7C.

As mentioned above, in many preferred implementations, waveguide 100 has pantoscopic and/or face curve tilts, as illustrated in FIGS. 2A and 2B. As a result, rays of image illumination typically enter and leave the waveguide at different angles, and consequently the image may suffer from chromatic aberrations, due to dispersion at the surface of the substrate glass. According to a further aspect of the present invention, FIGS. 7A-8C relate to a design of input wedge prism 132 that reduces these chromatic aberrations. To this end, transparent wedge element 132 is preferably deployed in an optical path between the image projector 200 and the reflective coupling-in surface 131, providing an input surface 134 associated with the projector aperture and an output surface 135 parallel to one of the major external surfaces of the LOE. The material of the input wedge 132 is chosen according to the chromatic aberrations in a manner that reduces them. In some cases, in order to provide additional degrees of freedom to correct the chromatic aberrations, the structure 132 includes two or more wedge components of materials that differ from one another in their dispersion properties. By choosing the right materials and optimizing the angle of the surface between the materials in 132 (e.g., surface between 132a and 132b), the chromatic aberrations can be substantially eliminated. FIGS. 7A-7C illustrate implementations employing one, two and three wedge components 132a, 132b and 132c, while FIG. 7D illustrates an exemplary context in which the input wedge 132 is deployed, equivalent to FIG. 4A, although it is equally applicable to all of the above embodiments.

According to certain particularly preferred implementations, input wedge 132 may employ two or more wedge components 132a and 132b which are oriented with different azimuth angles, as illustrated in FIGS. 8A-8C. In other words, the at least two wedge components include a first wedge element 132a having two non-parallel surfaces converging towards a first line of intersection 137a and a second wedge element 132b having two non-parallel surfaces converging towards a second line of intersection 137b. The first and second wedge elements 132a and 132b are then oriented such that the first and second lines of intersection 137a and 137b are non-parallel. This provides an additional degree of freedom for correcting chromatic aberration, and is particularly effective for correcting a diagonal chromatic aberration caused by a combination of face curve tilt and pantoscopic tilt. The choice of materials, the wedge angles of the wedge elements, and the azimuth orientation of each wedge element are preferably derived using optimization processes included in standard optical simulation software, as is known in the art. It will be noted that the lines of intersection 137a and 137b are illustrated here for simplicity of presentation as edges of the wedge, but in practical implementations, the wedges are not brought to a sharp edge, so the lines of intersection between their surfaces are a geometrical construct which lies outside the body of the wedge. Furthermore, although illustrated in FIG. 8C as two wedges of similar dimensions, for mechanical reasons, it is preferred to avoid unsupported projecting corners of the outer wedge. The outer wedge can either be truncated to avoid such overhang, or the lower wedge may be made larger to avoid overhang.

In all of the above cases of compound input wedge structures, the structure can either be assembled by attaching two appropriately formed wedge elements, or the structure can be formed by bonding together two blocks of the corresponding materials and then polishing the external surfaces to the required angles.

Alternative methods for reducing chromatic aberrations can also be used, to supplement or instead of the aforementioned input wedge structures. These include, for example, geometric phase elements together with high-efficiency color-filters (ref to SPIE conference paper 'Chromatic-aberration correction in geometric-phase lenses, for red, green and blue operation', J. Kim et al, Liquid Crystals XXI (2017)).

It should be noted that the structures in this embodiment can be applied to either refractive or diffractive waveguides. Thus, in a first set of implementations, the first progressive deflection arrangement is implemented as a first set of planar, mutually-parallel, partially-reflecting surfaces 111 located between the major external surfaces in the first region 110 of the LOE and having a first orientation, and the second progressive deflection arrangement comprises a second set of planar, mutually-parallel, partially-reflecting surfaces 121 located between the major external surfaces in the second region 120 of the LOE and having a second orientation non-parallel to the first orientation and oblique to the major external surfaces. These configurations are generally similar to those disclosed in the aforementioned PCT Patent Application Publication No. WO 2020/049542 A1, and further details of preferred implementations of such structures may be found therein. Alternatively, the first and second progressive deflection arrangements are implemented as first and second diffractive optical elements, also as is known in the art.

In one particularly preferred option as illustrated here, the support arrangement 106 is implemented as an eye glasses frame with sides for supporting the device relative to ears of the user. Other forms of support arrangement may also be used, including but not limited to, head bands, visors or devices suspended from helmets.

As mentioned earlier, the image projector 200 employed with the devices of the present invention is configured to generate a collimated image, i.e., in which the light of each image pixel is a parallel beam, collimated to infinity, with an angular direction corresponding to the pixel position. The image illumination thus spans a range of angles corresponding to an angular field of view in two dimensions.

Image projector 200 may be implemented in various ways, as is known in the art. The image projector typically includes at least one light source, which may be deployed to illuminate a spatial light modulator, such as an LCOS chip.

The spatial light modulator modulates the projected intensity of each pixel of the image, thereby generating an image. Alternatively, the image projector may include a scanning arrangement, typically implemented using a fast-scanning mirror, which scans illumination from a laser light source across an image plane of the projector while the intensity of the beam is varied synchronously with the motion on a pixel-by-pixel basis, thereby projecting a desired intensity for each pixel. In both cases, collimating optics are provided to generate an output projected image which is collimated to infinity. Some or all of the above components may be arranged on surfaces of one or more polarizing beam-splitter (PBS) cube or other prism arrangement, all as is known in the art.

It will be appreciated that the near-eye display 10 includes various additional components, typically including a controller (not shown) for actuating the image projector 200, typically employing electrical power from a small onboard battery (not shown) or some other suitable power source. It will be appreciated that the controller includes all necessary electronic components such as at least one processor or processing circuitry to drive the image projector, all as is known in the art. These components are generic to all near-eye displays, and are therefore not dealt with further herein.

It will be appreciated that the above descriptions are intended only to serve as examples, and that many other embodiments are possible within the scope of the present invention as defined in the appended claims.

What is claimed is:

1. A display for directing image illumination to an eye-motion box for viewing by an eye of a user, the display comprising:

(a) a light-guide optical element (LOE) formed from transparent material, said LOE having:
  (i) a set of mutually-parallel major external surfaces,
  (ii) a first progressive deflection arrangement associated with said LOE in a first region of said LOE, and
  (iii) a second progressive deflection arrangement associated with said LOE in a second region of said LOE;

(b) a support arrangement configured for supporting said LOE relative to the head of the user with one of said major external surfaces in facing relation to the eye of the user and in an orientation relative to the eye of the user such that an X axis parallel to said major external surfaces is oriented horizontally, a Y axis being parallel to said major external surface and perpendicular to said X axis;

(c) an image projector configured to project a collimated image from a projector aperture, said collimated image including a principal ray aligned with an optical axis of said image projector;

(d) a reflective coupling-in surface; and (e) a transparent wedge element deployed in an optical path between said image projector and said reflective coupling-in surface, said transparent wedge element providing an input surface associated with said projector aperture and an output surface parallel to one of said major external surfaces of said LOE, said LOE, said image projector and said reflective coupling-in surface being arranged such that the collimated image projected from said image projector passes through said transparent wedge element, is deflected by reflection at said reflective coupling-in surface and coupled into said LOE so as to propagate in a first direction within said LOE by internal reflection at said major external surfaces towards said first region, is redirected by said first progressive deflection arrangement so as to propagate in a second direction within said LOE by internal reflection at said major external surfaces towards said second region, and is redirected by said second progressive deflection arrangement so as to be coupled out of said LOE towards the eye of the user, and wherein said transparent wedge element is formed from at least two wedge components formed from materials having different dispersive properties, the collimated image projected from said image projector being transmitted through said at least two wedge components.

2. The display of claim 1, wherein said reflective coupling-in surface is obliquely oriented to both said X axis and said Y axis.

3. The display of claim 1, wherein said reflective coupling-in surface crosses a plane of one of said major external surfaces so as to lie partially within a thickness of said LOE and partially outside said thickness.

4. The display of claim 1, wherein said reflective coupling-in surface lies between planes defined by said mutually-parallel major external surfaces of said LOE.

5. The display of claim 1, wherein said at least two wedge components include a first wedge element having two non-parallel surfaces converging towards a first line of intersection and a second wedge element having two non-parallel surfaces converging towards a second line of intersection, said first and second wedge elements being oriented such that said first and second lines of intersection are non-parallel.

6. The display of claim 1, wherein said input surface is perpendicular to said principal ray of said collimated image.

7. The display of claim 1, wherein said output surface is associated with one of said major external surfaces via an air space or a low-index adhesive.

8. The display of claim 1, wherein said first progressive deflection arrangement comprises a first set of planar, mutually-parallel, partially-reflecting surfaces located between said major external surfaces in said first region of said LOE and having a first orientation, and wherein said second progressive deflection arrangement comprises a second set of planar, mutually-parallel, partially-reflecting surfaces located between said major external surfaces in said second region of said LOE and having a second orientation non-parallel to said first orientation and oblique to said major external surfaces.

9. The display of claim 1, wherein said first and second progressive deflection arrangements are implemented as first and second diffractive optical elements.

* * * * *